(12) United States Patent
Leone et al.

(10) Patent No.: US 8,065,979 B2
(45) Date of Patent: *Nov. 29, 2011

(54) ON-BOARD WATER ADDITION FOR FUEL SEPARATION SYSTEM

(75) Inventors: Thomas G. Leone, Ypsilanti, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,218

(22) Filed: Dec. 2, 2010

(65) Prior Publication Data

US 2011/0072838 A1    Mar. 31, 2011

Related U.S. Application Data

(63) Continuation of application No. 12/117,167, filed on May 8, 2008, now Pat. No. 7,845,315.

(51) Int. Cl.
*F02B 47/04* (2006.01)
*F02B 47/00* (2006.01)

(52) U.S. Cl. ......... 123/1 A; 123/3; 123/25 R; 123/25 C; 123/25 J

(58) Field of Classification Search .................. 123/1 A, 123/3, 25 R–25 Q
See application file for complete search history.

(56) References Cited

U.S. PATENT DOCUMENTS 5,044,344 A    9/1991    Tuckey et al.

FOREIGN PATENT DOCUMENTS

JP    62210229 A    9/1987
JP    5163976 A    6/1993

OTHER PUBLICATIONS

Office Action of Chinese Application No. 200610148453.4, Issued Mar. 24, 2011, State Intellectual Property Office of PRC, 9 Pages.

*Primary Examiner* — Noah Kamen
(74) *Attorney, Agent, or Firm* — Allan J. Lippa; Alleman Hall McCoy Russell & Tuttle LLP

(57) ABSTRACT

A fuel delivery system for an internal combustion engine including a fuel tank, a membrane dividing the fuel tank into at least a first and second portion, the membrane preferentially diffusing a substance from a mixture, the substance having an increased knock suppression relative to the mixture, and a controller adjusting delivery of condensed water to the tank responsive to an operating condition.

17 Claims, 4 Drawing Sheets

ON-BOARD WATER ADDITION FOR FUEL SEPARATION SYSTEM

CROSS REFERENCE TO RELATED APPLICATIONS

The present application is a continuation of U.S. patent application Ser. No. 12/117,167 filed May 8, 2008, the entire contents of which are incorporated herein by reference.

BACKGROUND/SUMMARY

Engines may operate using a plurality of different substances, which may be separately delivered, or delivered in varying ratios, depending on operating conditions. For example, an engine may use a first fuel (ethanol) and a second fuel (gasoline), each with different knock suppression abilities, to reduce engine knock limitations while improving overall fuel economy. As another example, an engine may use fuel injection and water injection.

Various approaches may be used to store different substances on-board a vehicle. For example, the different substances may be stored separately in different storage tanks, and thus filled separately. Alternatively, different substances may be stored in a mixed state, and then separated on-board the vehicle to enable individual control of delivery to the engine.

One approach which allows ethanol to be separated from a blended fuel mixture is described in US 2007/0221163. In US 2007/0221163 a separating device, fluidly coupled downstream of the fuel tank, is used to separate ethanol from a blended fuel mixture. A series of injectors are used to supply the separated fuel to a combustion chamber in the engine. Water may be provided to the separating device to aid in the separation of the ethanol from the blended fuel mixture. The water is recovered from the engine exhaust.

The inventor has recognized several disadvantages with this approach. For example, depending on the conditions and the amount of water in the mixture, the mixture may be subject to freezing. Freezing may in turn degrade separation, as well as various components of the system.

As such, in one approach, a fuel delivery system for an internal combustion engine including a fuel tank, a membrane dividing the fuel tank into at least a first and second portion, the membrane preferentially diffusing a substance from a mixture, the substance having an increased knock suppression relative to the mixture, and a controller adjusting delivery of condensed water to the tank responsive to an operating condition.

In this way, not only is it possible to adjust the rate of separation of a knock suppressing substance via control of condensed water delivery, but in addition it is possible to reduce risks of freezing. As one example, the delivery of condensed water can be reduced under conditions where ambient temperatures are decreased, even when increased water is needed to aid separation.

DETAILED DESCRIPTION

A vehicle's engine may operate with a plurality of substances including different fuels, knock suppressing substances, etc. For example, an engine may operated with different fuels having different knock suppressing capabilities, either due to an injection type (direct or port injection, for example), or due to fuel properties. For example, direct injection may provide increased knock suppression compared with port injection. As another example, direct injection of a fuel having an increased alcohol concentration (as compared to another fuel) may also provide increased knock suppression. As still another example, water injection may also be used to affect engine combustion and reduce knock under some conditions. The water may be injected via one or more injectors, or mixed with one or more fuels in varying concentrations.

As described herein, various approaches are described for advantageously using a membrane to selectively separate one or more substances from a mixture. In one particular example, the membrane selectively transfers an alcohol (e.g., ethanol) from a mixture of gasoline and alcohol on one side, to water (or a water/alcohol mixture) on the other side. Further, the transfer rate across the membrane may be adjusted by, for example, selectively delivering additional water to the water/alcohol mixture. In this way, the increased knock suppression of the water/ethanol mixture may be separately delivered to the engine from the gasoline/alcohol mixture to thereby obtain increased engine performance while reducing knock limitations.

Figure 1:
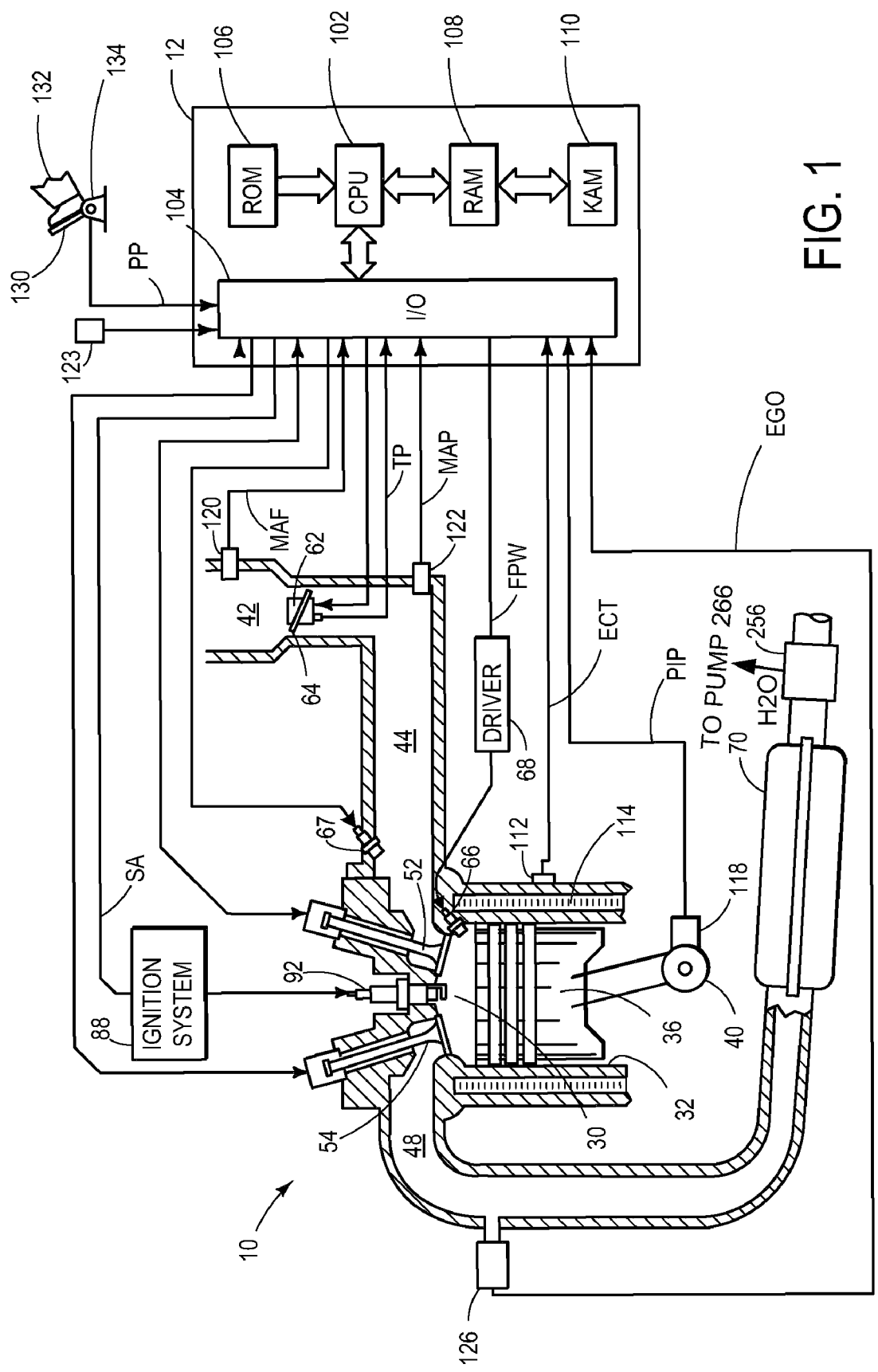
FIG. 1 shows a schematic depiction of one cylinder in the internal combustion engine.

Referring now to FIG. 1, it shows a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passages 42 may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via a valve actuator. Similarly, exhaust valve 54 may be controlled by controller 12 via another valve actuator. Additionally, both the intake and exhaust valves may be adjusted via a common actuator. For example, during some conditions, controller 12 may operate the valve actuator to vary the opening and/or closing of the respective intake and/or exhaust valves. The valve actuator may include one or more of electromagnetic valve actuators for operating cam-less valves, a cam profile switching (CPS) actuator, variable cam timing (VCT) actuator, a variable valve timing (VVT) actuator and/or a variable valve lift (VVL) actuator to vary valve operation.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. In this example, fuel may be delivered to fuel injector 66 by a fuel delivery system, shown in FIG. 2 discussed in more detail herein. Specifically fuel injector 66 may be included in fuel injectors 244, shown in FIG. 2. In other examples, other suitable fuel delivery systems may be utilized.

Additionally, in this example, a fuel injector 67 is arranged in a port of intake manifold 44 in a configuration that provides what is known as port injection of fuel into the intake port upstream of combustion chamber 30. Further in this example, fuel injectors 254, shown in FIG. 2, may include port fuel injector 67.

Continuing with FIG. 1, Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Ignition system may include a battery capable of delivering electrical power to the spark plug and other systems in the vehicle. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Emission control device 70 may be a three way catalyst (TWC), NOx trap, various other emission control devices, or combinations thereof.

A condenser 256, discussed in more detail herein, may be fluidly coupled downstream of the emission control device. Under some conditions water may be condensed in the condenser, and removed from the condenser via a pump 266, shown in FIG. 2.

Again referring to FIG. 1, controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; a key position from ignition sensor 123; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. As described above, FIG. 1 shows only one cylinder of a multi-cylinder engine, and that each cylinder may similarly include its own set of intake/exhaust valves, fuel injector(s), spark plug, etc.

Figure 2:
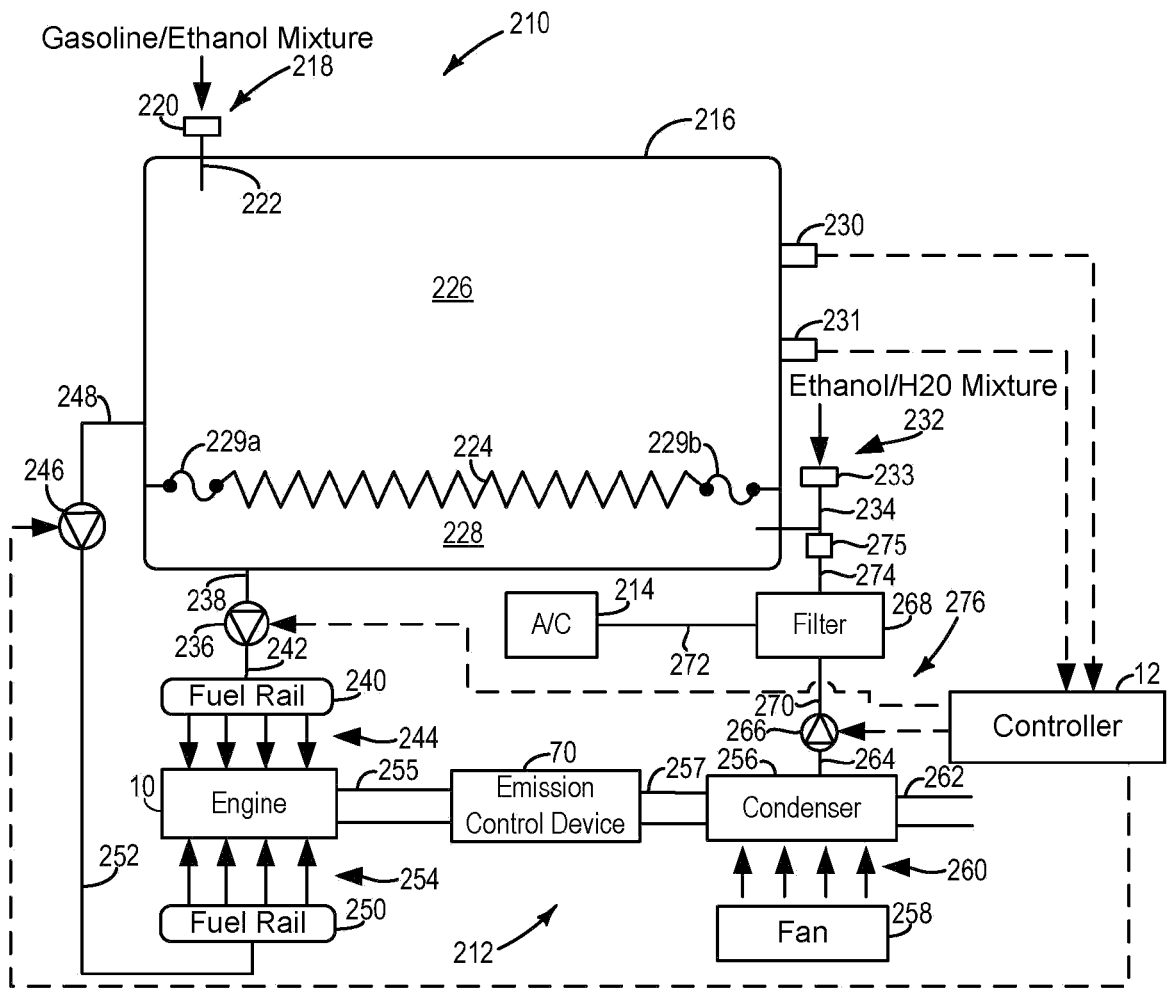
FIG. 2 shows a schematic depiction of a vehicle's exhaust, air conditioning, and fuel delivery systems.

FIG. 2 shows a schematic depiction of a vehicle's fuel delivery system 210, exhaust system 212, and an air conditioning system 214.

The fuel delivery system 210 may include a fuel tank 216 having a first port 218. A selectively permeable membrane 224 may be used to separate the fuel tank into an upper portion 226 and a lower portion 228, where the membrane may be enclosed by the fuel tank. In this example, the first port may include a fuel cap 220, a passage 222, and a valve (not shown), allowing fuel to be directed into an upper portion 226 of the fuel tank 216. In other examples, another suitable mechanism, allowing a fuel or a blended fuel mixture to be directed into the upper portion of the fuel tank, may be used.

The substances in the blended fuel mixture of the upper portion may include gasoline and an alcohol, such as ethanol, methanol, etc. In particular, fuel with various percentages of ethanol may be delivered to the fuel tank. In some examples, a fuel having 10% ethanol and 90% gasoline may be delivered to the fuel tank. In other examples, a fuel having 85% ethanol and 15% gasoline may be added to the fuel tank. Yet in other examples, alternative substances may be used. The lower portion may also house a mixture, such as an alcohol/water mixture.

The membrane 224 may include one or more membrane elements. A membrane element can include a selectively permeable membrane element that permits at least one component of a mixture to pass through the membrane element from the upper portion to the lower portion (or vice versa) at a greater rate than at least one other component of the fuel mixture.

As one non-limiting example, the membrane element can be configured to permit at least an alcohol component of a fuel mixture to permeate through the membrane element from the upper portion to the lower portion of the fuel tank. In this way, the membrane element can provide a fuel separation function, whereby a permeant includes a higher concentration of the alcohol component and a lower concentration of the hydrocarbon component than the initial fuel mixture due in part to the selectivity of the membrane element, where the term permeant may be used herein to describe the fuel component or components that permeate the membrane element.

In one example, the rate of separation of an alcohol from a gasoline/alcohol mixture in the upper portion may be affected by a concentration of alcohol in a water/alcohol concentration in the lower portion.

The membrane may be configured to provide increased surface area for a given fuel tank size. The larger surface area allows a greater amount of alcohol to be separated from the blended fuel mixture, when desired. In this example, the membrane is pleated to form an accordion-like structure. Additionally, the membrane may be supported by a porous surface such as zirconia. In other examples, the membrane may be honeycomb-shaped. Furthermore, the membrane may include a number of different layers of membrane elements which may assist in the separation performance.

In some examples, the membrane element may include a polymer and/or other suitable material that permits an alcohol component to permeate through the membrane element at a higher rate than a hydrocarbon component. For example, the membrane element may include polyethersulfone that contains both polar and nonpolar characteristics, with the polar interaction dominant to an outer section of the membrane element, which permits alcohol to permeate the membrane element to a greater extent than the hydrocarbons. Additionally or alternatively, membrane element may include a nanofiltration material that utilizes molecule size exclusion and/or chemical selectivity to separate an alcohol component from a hydrocarbon component of a fuel mixture.

Additionally, in this example, flexible joints 229a and 229b, are coupled to the membrane, allowing the position of the membrane to be passively adjusted as the volumes or relative volumes of the fluids in both the upper and/or lower portion of the fuel tank change. In this manner, the amount and/or relative concentration of the various substances in the upper and/or lower portion of the fuel tank can be adjusted during diffusion or during refueling of the fuel tank, without requiring additional space in the fuel tank. In alternate examples, the membrane may be actively adjusted via a height adjustment mechanism (not shown) in response to a change in the amount or relative concentration of the knock suppressing substance(s) and/or gasoline in the upper and/or lower portion of the fuel tank.

While the above example describes the membrane mounted in a horizontal configuration, the membrane may also divide the tank in a vertical configuration. In such a configuration, the membrane may be substantially fixed.

A concentration sensor 230 and a fuel gage 231 may be coupled to the upper portion of the fuel tank. The concentration sensor may be configured to determine the concentration of one or more substances in the fuel blended mixture enclosed by the upper portion of the fuel tank. In other examples, a plurality of concentration sensors may be located in the upper portion of the fuel tank. Yet in other examples, an algorithm may be used to determine the concentration of a specified substance in the blended fuel mixture. In some examples, the concentration sensor 230 may be positioned at a low point in the upper portion fuel tank, thereby allowing measurement of the concentration of a specified substance to be measured when only a small amount of fuel remains in the upper portion of the fuel tank. Additional concentration sensors (not shown) may be located in the lower portion of the fuel tank, allowing the concentration of one or more substances in the lower portion of the fuel tank to be determined.

Fuel gage 231 may be configured to determine the amount of fuel in the upper portion of the fuel tank. In some examples, fuel gage 231 may be a float type fuel gauge. In other examples, another suitable type of gauge may be used that is capable of determining the amount of fuel contained in one or both portions of the fuel tank. Furthermore, an additional fuel gage (not shown) may be located in the lower portion of the fuel tank, allowing the amount of substances in the lower portion of the fuel tank to be determined.

A second port 232 may be fluidly coupled to the lower portion of the fuel tank, allowing a delivery of substances to the lower portion of the fuel tank. In this example, the second port may include a fuel cap 233, a passage 234, and a valve (not shown).

The lower portion of the fuel tank may be fluidly coupled to a fuel pump 236 by a fuel line 238. In this example, fuel pump 236 is electronically actuated by controller 12. Fuel pump 236 may be coupled to a first fuel rail 240 by fuel line 242. The first fuel rail may be coupled to a series of fuel injectors 244. In this example, fuel injectors 244 inject fuel directly into the combustion chambers of the engine 10. Further in this example, the fuel injectors may include fuel injector 66, shown in FIG. 1. However, in other examples, the fuel injectors may include port fuel injectors and the number of injectors may be altered. The timing of the fuel injection may be applied in such a way to utilize the charge cooling effects of the mixture in the lower portion, thereby reducing knock limits on engine operation.

Continuing with FIG. 2, the upper portion of the fuel tank may be coupled to a fuel pump 246 by a fuel line 248. In this example, fuel pump 246 is electronically actuated by controller 12. The fuel pump 246 may be coupled to a second fuel rail 250 by fuel line 252. In this example, the second fuel rail may be fluidly coupled to a series of port fuel injectors 254. Further in this example, one of the port fuel injectors may include fuel injector 67, shown in FIG. 1.

Continuing with FIG. 2, exhaust system 212, capable of delivering water to the lower portion of the fuel tank, is fluidly coupled to engine 10. The exhaust system may further include emission control device 70 fluidly coupled to the engine via a duct 255. The emission control device may be fluidly coupled to condenser 256 via duct 257. The condenser allows liquid water to be collected from the exhaust stream. Fan 258 may be configured to direct cooling air 260 over and around the condenser, affecting liquid formation in the condenser. In alternate examples, the fan may be removed and air generated by the vehicle's motion may be directed over and around the condenser to provide cooling air for condensation. Exhaust gases may exit the condenser through a tailpipe 262.

A pump 266 may be fluidly coupled to the condenser by conduit 264. Pump 266 may increase the pressure of the water in the conduit, allowing water to be delivered to the lower portion of the fuel tank. In other examples, a gravity fed system may be used to deliver water to the lower portion of the fuel tank. A filter 268 may be coupled to pump 266 by conduit 270, allowing impurities to be removed from the water collected in the condenser. A valve 275 may be fluidly coupled downstream of filter 268 and adjusted by controller 12. Condenser 256, pump 266, filter 268, and valve 275 may be included in a water condensate system 276.

Additionally or alternatively, condensate from the air conditioning system 214 may be collected and delivered to the lower portion of the fuel tank through conduit 272, filter 268, and conduit 274.

The fuel delivery system may be configured, under some conditions, to adjust alcohol/water concentration in the lower portion of the fuel tank, to thereby adjust not only the rate of separation across the membrane, but also the freezing characteristics of the mixture. For example, the amount of water delivered to the lower portion of the fuel tank may be adjusted responsive to operating conditions, thereby adjusting the alcohol/water concentration, and thus the freezing characteristics and/or the separation. The water delivered to the lower portion may be adjusted in a variety of ways. These may include, for example, adjusting valve 275, adjusting pump 266, adjusting cooling air 260, adjusting operation of the air conditioning system, and/or combinations thereof.

Figure 3:
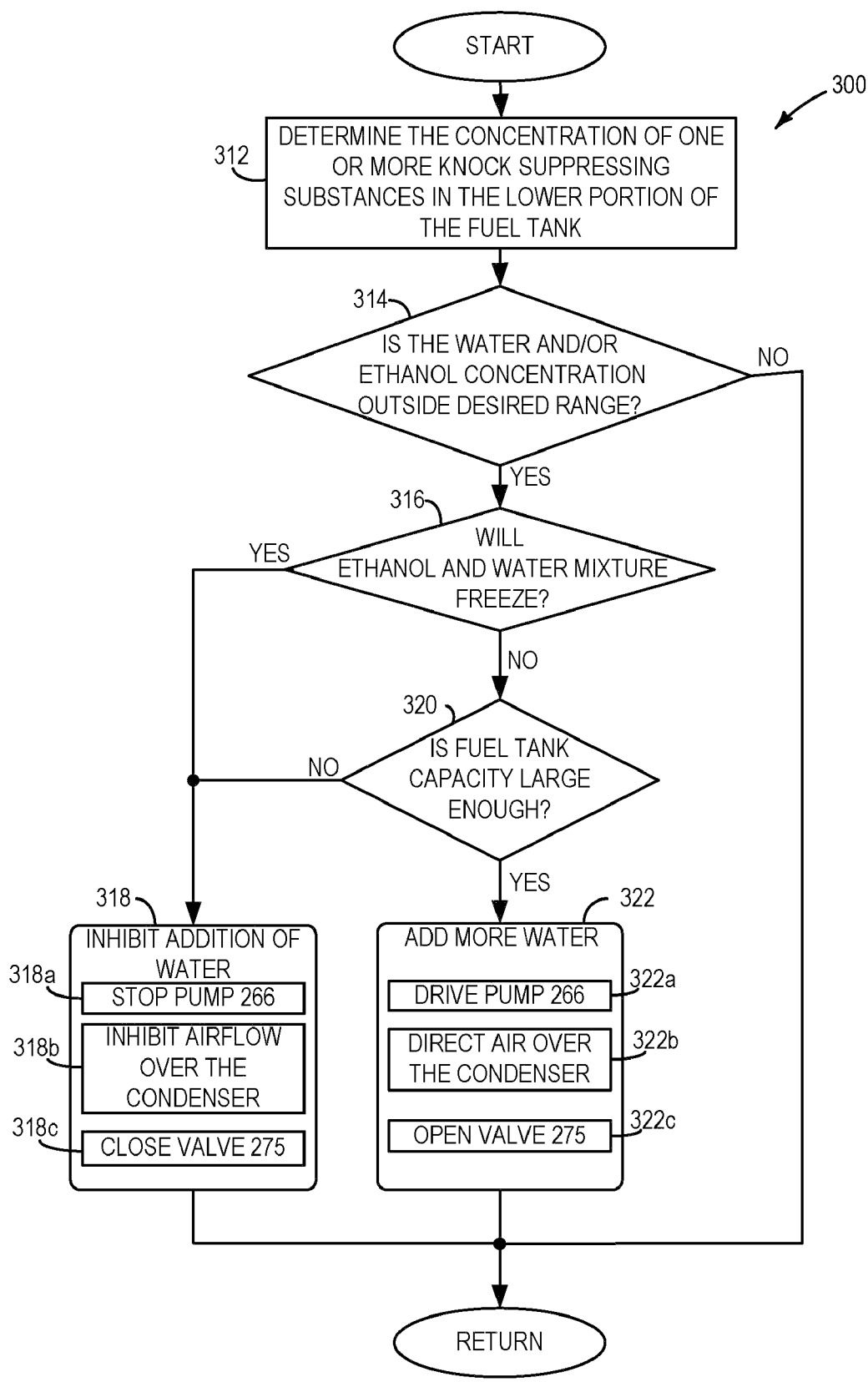
FIG. 3 shows a first example method for adjusting water provided to the fuel tank.
Figure 4:
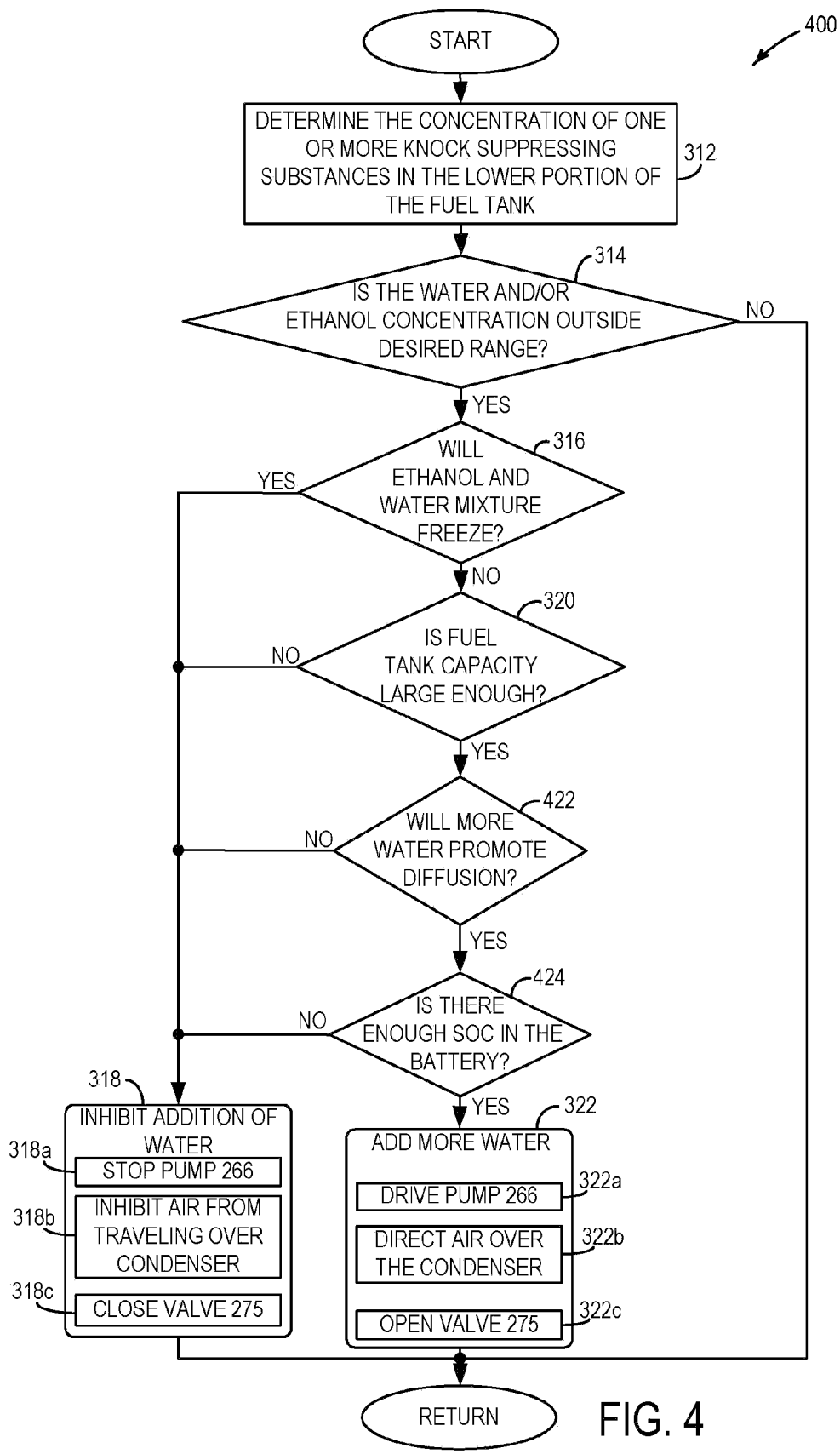
FIG. 4 shows a second example method for adjusting water provided to the fuel tank.

Various methods may be used to adjust the water delivered to the fuel tank, such as shown in FIG. 3 and FIG. 4, for example.

Specifically, the following control method, shown in FIG. 3 and FIG. 4, may be implemented to adjust, and in some cases increase, the rate of separation of an alcohol, such as ethanol, from a blended fuel mixture in the upper portion of the fuel tank. Additionally, the following control method may reduce degradation or deterioration of the fuel delivery system, and increase the efficiency of the engine. In particular, under some conditions, the control method may reduce a possibility of freezing in the fuel tank, lines, pumps, valves, etc.

Referring now specifically to FIG. 3, it shows a method 300 that may be implemented to adjust the rate of separation of an alcohol in the fuel tank in response to a plurality of operating conditions. The operating conditions may include: demand for knock suppression, feedback from an engine knock sensor, ambient temperature, pedal position, throttle position, exhaust temperature, exhaust gas composition, etc.

At 312, an alcohol/water concentration in the lower portion of the fuel tank is determined. In some examples, the concentration may be indicated by at least one concentration sensor. In other examples, the concentration may be inferred from various operating parameters.

The method then proceeds to 314, where it is determined if the concentration of the water in the lower portion of the fuel tank is outside a desired range, e.g., a desired range for controlling separation, while reducing changes for freezing. In other examples, it may be determined if the concentration of ethanol in the lower portion of the fuel tank is outside a desired range. Yet in other examples, it may be determined if the amount of water and/or ethanol in the lower portion of the fuel tank is outside a desired range. In some examples, it may be determined whether the concentration of water is above a threshold value, the threshold value calculated during each iteration of method 300 based on various operating conditions, such as ambient temperature. Additionally, the operating conditions may include: amount of fuel in the fuel tank, engine speed, vehicle speed, engine load, concentration of one or more substances in the blended fuel mixture, requested torque, engine temperature, etc. As one specific example, as the ambient temperature decreases, the threshold level of water may decreased. As another specific example, as the ambient temperature decreases, threshold level of ethanol may increase.

Further, the desired range of water and/or ethanol in the lower portion may be adjusted based on a desired amount, or level, of water and/or ethanol in the lower portion. In one example, the water addition may be adjusted to provide sufficient levels of a desired water/ethanol blend.

If it is determined that the concentration of water and/or ethanol is in the desired range, the method ends.

Otherwise, the method proceeds to 316, where it is determined if the ethanol and water mixture will freeze when additional water is added to the ethanol/water mixture. In other examples, it may be determined if the viscosity of the ethanol and water mixture has increased beyond a threshold value. The aforementioned determinations may take into account such parameters as the ambient temperature, engine temperature, concentration of water and/or ethanol, flowrate of ethanol water mixture through injectors, and various others.

If it is determined that the mixture is subject to freezing when additional water is added to the lower portion of the fuel tank, the method proceeds to 318, where actions are taken to inhibit the addition of water to the lower portion of the fuel tank. The actions may include but are not limited to: at 318a, shutting down operation of pump, at 318b, inhibiting airflow over the condenser which may include stopping operation of fan 258 or redirecting air away from the condenser, at 318c, closing valve 275, or combinations thereof. In other examples, at 318 actions may be taken to decrease the amount of water delivered to the lower portion of the fuel tank. After 318 the method returns to the start.

If it is determined at 316 that the mixture is not subject to freezing, the method then proceeds to 320, where it is determined if the fuel tank capacity is large enough to accommodate more water in the lower portion of the fuel tank. The aforementioned determination may take into account such parameters as fuel tank volume, position of the membrane, etc. If it is determined that the fuel tank capacity is not large enough to accommodate additional water, the method proceeds to 318, where actions are taken to inhibit the addition of water to the lower portion of the fuel tank.

However, if it is determined that the fuel tank capacity is large enough to accommodate additional water in the lower portion of the fuel tank the method proceeds to 322, where actions are taken to add more water to the lower portion of the fuel tank. These actions may include but are not limited to at 322a, driving pump 266, at 322b, directing air over the condenser which may include driving fan and/or redirecting air over and/or around the condenser, and opening valve 275, at 322c. In this way, a control method may be implemented to increase the rate of diffusion of a knock suppressing substance when needed, while reducing degradation of the fuel delivery system due to various parameters such as temperature, fuel tank volume, and various others. After 322 the method returns to the start.

In another example, as shown in FIG. 4, additional actions may be added to method 300, shown in FIG. 3, which may inhibit water from being added into the fuel tank when the addition of more water will not promote more diffusion and/or when the state of charge of a battery is below a threshold and thus may not be able to power other systems in the vehicle. Method 400 may progress in a similar approach to that shown in method 300. Similar acts are labeled accordingly.

Now referring to FIG. 4, at 422 it is determined if the addition of more water to the lower portion of the fuel tank will promote more diffusion of the knock suppressing substance. If it is determined that the addition of more water to the lower portion of the fuel tank will not promote more diffusion, the method advances to 318. However, if it is determined that the addition of more water to the lower portion of the fuel tank will promote more diffusion the method advances to 424. At 424 it is determined if there is sufficient battery charge to operate the pump 266 and/or fan 258, shown in FIG. 2, enabling water to be added to the lower portion of the fuel tank. In other examples, it may be determined, at 424, if the battery state of charge is above a predetermined value which may take into account electrical power consumption of the vehicle, ignition, and various other operations. If there insufficient battery charge, the method proceeds to 318. Otherwise, the method advances to 322.

In this way, control of condensate to the fuel tank is adjusted responsive to the battery state of charge to reduce battery load from the fans/pumps when the state of charge is low, for example.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel delivery system for an engine comprising:
    a fuel tank;
    a membrane dividing the fuel tank into at least a first and second portion, the membrane preferentially diffusing alcohol from a gasoline-alcohol mixture, the alcohol having an increased knock suppression relative to the mixture; and
    a controller adjusting delivery of condensed water to the tank responsive to an operating condition.

2. The fuel delivery system of claim 1 wherein the alcohol comprises methanol.

3. The fuel delivery system of claim 2 wherein the controller reduces delivery of water responsive to reduced temperature.

4. The fuel delivery system of claim 3 wherein the operating condition includes an amount of water in the second portion of the tank.

5. The fuel delivery system of claim 1 further comprising a battery, the operating condition including a battery state of charge.

6. The fuel delivery system of claim 1 wherein the condensed water is collected from an exhaust of the engine.

7. The fuel delivery system of claim 1 wherein the operating conditions include a fuel tank level of one of the first and second portions.

8. The fuel delivery system of claim 1 wherein the first portion contains the mixture.

9. The fuel delivery system of claim 1 wherein the condensed water is gathered from an air conditioning system, and where the controller adjusts operation of the air conditioning system to adjust delivery of the condensed water.

10. The fuel delivery system of claim 1 wherein the controller further adjusts delivery of condensed water by adjusting a pump.

11. The fuel delivery system of claim 1 wherein the controller further adjusts delivery of condensed water by adjusting a flow of air over a condenser.

12. A fuel delivery system for an engine, comprising:
    a fuel tank;
    an engine exhaust;
    a flexible membrane dividing the fuel tank into at least a first and second portion, the membrane preferentially diffusing alcohol from a gasoline-alcohol mixture, the alcohol having an increased knock suppression relative to the mixture; and
    a controller reducing delivery of condensed water, collected from the exhaust, to the tank responsive to a reduced temperature.

13. The fuel delivery system of claim 12 further comprising a battery, the controller further adjusting delivery of condensed water responsive to an operating condition, the operating condition including a battery state of charge.

14. A fuel delivery system in an engine of a vehicle, comprising:
    a fuel tank;
    a battery;
    a membrane dividing the fuel tank into at least a first and second portion;
    a port injector coupled to the first portion;
    a direct injector coupled to the second portion;
    a water condensate system coupled to the second portion, the water condensate system including an electrically driven actuator configured to adjust delivery of water condensate to the second portion of the fuel tank; and
    a controller configured to adjust the actuator in response to an ambient temperature and concentration of water in the second portion of the fuel tank.

15. The fuel delivery system of claim 14 wherein the actuator is a pump coupled to a condenser included in the water condensate system.

16. The fuel delivery system of claim 14 wherein the actuator is a fan configured to direct air over a condenser included in the water condensate system.

17. The fuel delivery system of claim 14 wherein the controller further adjusts the actuator in response to a fuel level and a state of charge of the battery.

* * * * *